Jan. 17, 1928. 1,656,811

H. H. ASKEW ET AL

PRESSURE RETAINING VALVE

Filed Aug. 1, 1925

INVENTOR.
Harvey H. Askew
and
James H. Askew
BY
ATTORNEY.

Patented Jan. 17, 1928.

1,656,811

UNITED STATES PATENT OFFICE.

HARVEY H. ASKEW AND JAMES H. ASKEW, OF SAN BERNARDINO, CALIFORNIA; IDA N. ASKEW ADMINISTRATRIX OF SAID JAMES H. ASKEW, DECEASED.

PRESSURE-RETAINING VALVE.

Application filed August 1, 1925. Serial No. 47,500.

Among the salient objects of our invention is to provide a simple and efficient pressure retaining valve mechanism which can be interposed in an air brake system for the purpose of retaining a predetermined pressure in the brake cylinders after the application of the brakes, and which will thus put the complete control of the air brakes of a railway train in the hands of the engineer; to provide such a pressure retaining valve mechanism which can be readily attached to the triple valve of an air brake system and which will automatically control the exhaust from said tripple valve; to provide in a mechanism of the character referred to a slide valve adapted to be operated by the movement of an element, or diaphragm, having two different air pressures against the opposite sides thereof, the varying of said pressures causing the movement of said vlave; and, in general, to provide a simple and practical device of the character referred to.

When used in connection with an air brake system of a railway train, said pressure retaining valve operates to hold a predetermined pressure in the brake cylinder while the engineer recharges the auxiliary reservoir after the application of the brakes.

In order to explain our invention, we have illustrated one practical embodiment thereof on the accompanying sheet of drawings, in which,—

Figure 1:
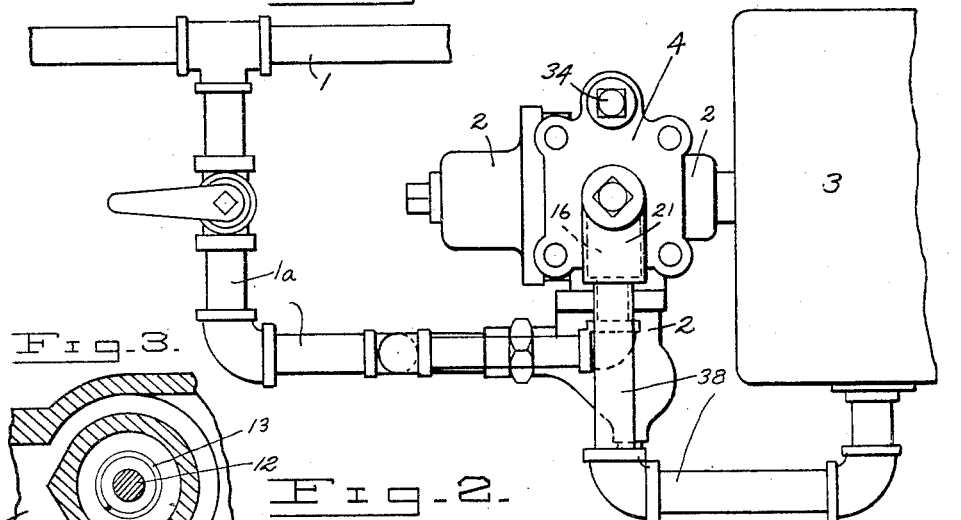
Figure 1 is a fragmentary view showing our invention in connection with a brake pipe line, triple valve and air reservoir.
Figure 3:
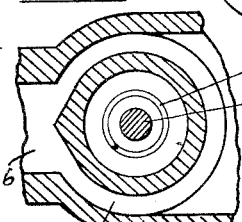
Figure 3 is a sectional view taken on line 3—3 of Fig. 2.
Figures 2, 4:
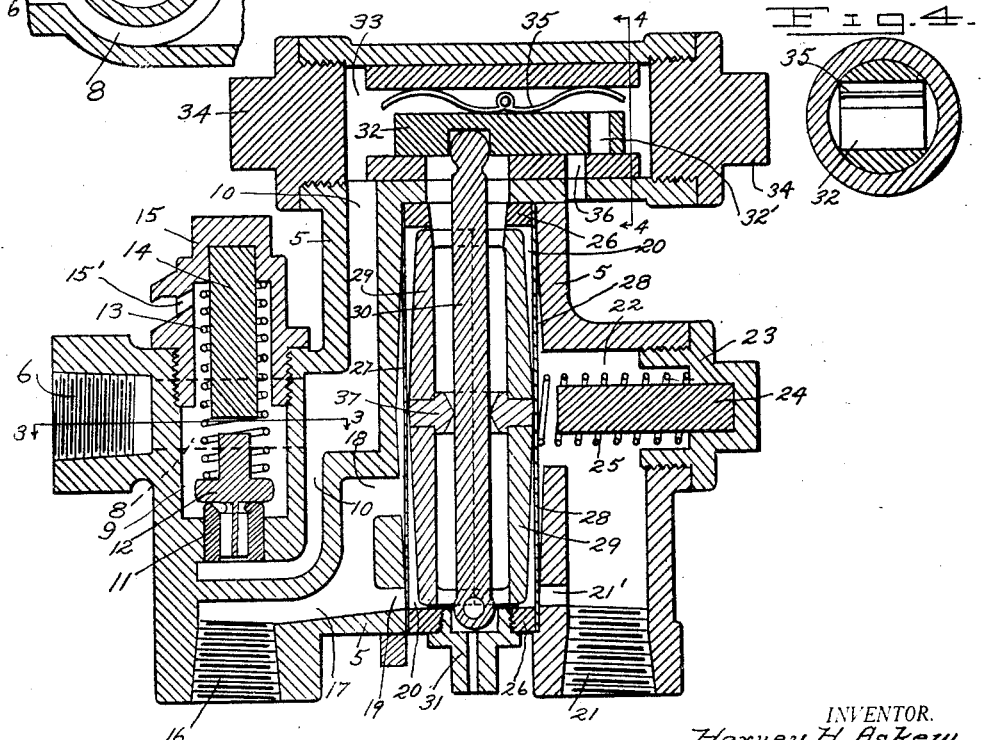
Figure 2 is a vertical sectional view taken through our invention as here illustrated.
Figure 4 is a sectional view taken on line 4—4 of Fig. 2.

Referring now to the drawings, 1 designates a brake pipe line, 2, the usual triple valve, and 3 an air reservoir. Our improved retaining valve is designated as a whole 4, and is shown attached to the side of the triple valve. Referring to Fig. 2, our valve body as here represented, comprises a casting 5, adapted at 6, to be connected to the exhaust of the triple valve 2; said connection connecting a by-pass 8, around a vertical valve chamber 9, with a passageway, 10. A valve seat, 11, is arranged in the lower end of the valve chamber, 9, upon which seats a flexible valve, 12, upon the upper end of which seats the lower end of a coiled spring, 13, the upper end of which spring is around a member 14, in a hollow member 15, screwed into the body over said valve chamber 9, as indicated in Fig. 2. This spring, 13, yieldingly holds the valve 12, seated upon the valve seat 11, and the strength of the spring used determines the pressure necessary to open said valve. Said valve chamber 9 communicates through said valve seat member 11, with a passageway 10. Said body is also provided at its lower left hand side, as seen in Fig. 2, with a threaded inlet opening, as 16, connecting with passageway, 17, divided into two branches, as 18 and 19, connecting with a central chamber 20, in said body 5, and hereinafter again referred to. Said body also has at its lower right hand side, as here illustrated, a third threaded opening, as 21, terminating at its upper end in a horizontal chamber, 22, closed by means of a screw plug, 23, having an inwardly extending member 24, around which is a coiled spring, 25. Mounted in the central chamber 20, is a ring member having a diameter equal to the vertical height of said chamber 20, said ring member being designated 26, and having at its opposite sides two thin metal discs, 27 and 28, between which, within said ring 26, is a tubular shaped member 29, made in halves, as indicated by the dotted line back of the member 30, which is an operating lever, the lower end of which is pivotally connected to an anchor plug, 31, screwed into a threaded opening in the lower side of the ring member 26, and the upper end of which lever fits into the underside of a slide valve member 32, in a horizontal chamber 33, with which communicates the passageway 10. Said horizontal chamber 33, is closed at its opposite ends with screw plugs, 34, 34, with a spring member, 35, therein, bearing on said slide valve 32, as indicated. Said slide valve 32, has an opening, 32' therethrough adapted to be moved into and out of register with an outlet port, 36, which opens said horizontal chamber 33 to the atmosphere. The coiled spring 25, it will be noted bears at its inner end against the round disc, 28. The tubular member 29, is provided in its middle portion with two bearing members, 37, 37, bearing on opposite sides of the valve operating lever, 30, for moving said lever on its pivot back and forth to move the slide valve in the upper part of the valve body.

Thus our pressure retaining valve body is connected by means of the threaded member 6, with the exhaust of the usual triple valve of a brake system, while the threaded member 16, of our said valve is connected with a pipe line 1, by a branch pipe 1ª, which branch pipe 1ª, is also connected with the triple valve 2, in the usual way. The threaded member 21 of our said valve is connected by means of a pipe, 38, to the air reservoir, 3, which reservoir is also connected with the triple valve in the usual way, as at 2.

Without our pressure retaining valve, when an engineer applies the air brakes and releases them, all the air which has passed from the reservoir to the brake cylinders, through the triple valves, is released and escapes into the atmosphere through the exhaust of said triple valve and is lost and there is not sufficient pressure in the reservoir to apply the brakes until a fresh supply has been pumped into said reservoir, and the engineer is helpless until the reservoir is again filled. With our invention, this air from the exhaust is discharged through the connection at 6, into the by-pass 8, and the passageway 10, and if the pressure is sufficient, it operates the valve 12 and passes into the chamber 9, and can escape through an outlet at 15′, in the hollow member 15. The pressure from the brake pipe line, 1ª, being connected with the threaded member 16, and bearing against the disc, 27, in the central chamber 20, forces the member 29, and the valve operating lever 30, and the slide valve 32, to the right, as shown in Fig. 2, and this closes the outlet port 36, and prevents the exhaust from the triple valve from escaping therethrough. The pressure in the reservoir, being connected to the member 21, bears against the opposite disc, 28, but until the reservoir pressure has been raised, it is not sufficient to move the member, 29, and the operating lever 30 and slide valve 32, to the left, and thereby open the outlet port 36. The spring 25, which bears against the disc, 28, is for the purpose of overcoming the friction of the moving parts only.

Thus the pressure from the brake pipe line, connected at 16, and the pressure from the auxiliary reservoir 3, connected at 21, bear against the opposite sides of the diaphragm, composed of the discs 27 and 28, and the member 29, to move the operating lever 30, and the slide valve 32, to control the exhaust port at 36. Drain openings, as 19 and 21′ are provided at the lower sides of said discs, 27 and 28, to permit condensation or other matters to escape from the outside of said discs, while the member 31, permits anything of the kind to escape from within the member 29, or between said discs, as is clear. When the pressure in the auxiliary reservoir is down on account of the application of the brakes, the pressure from the brake pipe line, connected at 16, operates the diaphragm to close the slide valve 32, and thus the exhaust from the triple valve is held in the device, and only partial release of the brakes accomplished, until the reservoir is again recharged by the engineer. When this is done, the pressure operates to move the opposite side of the diaphragm and to open the slide valve 32, and then there is a full release. Thus a predetermined brake cylinder pressure is retained by our device, depending on the spring 13, used to hold the valve 12, until the reservoir is recharged. This gives the engineer full control and enables him to again apply the brakes in emergency after they have been applied and released.

While we have shown and described one practical embodiment of our invention on the accompanying sheet of drawings, we are aware that changes in details of construction and arrangement can be made without departing from the spirit thereof, and we do not therefore, limit our invention to the showing made, except as we may be limited by the hereto appended claims.

What we claim and desire to secure by Letters Patent is:

1. In an air brake system, in combination with the brake pipe line, reservoir and triple valve, of an automatic pressure retaining valve interposed therein and connected with the exhaust, a valve member therein adapted to hold said exhaust, and a diaphragm operated by the pressure in said reservoir and connected for moving said valve member to open position, whereby when said reservoir pressure is increased, said valve member is moved and said exhaust is released.

2. In an air brake system, in combination with the brake pipe line, reservoir and triple valve, of an automatic pressure retaining valve interposed therein and connected with the exhaust of said triple valve, a spring pressed valve member therein for holding said exhaust pressure, a slide valve member adapted to hold said exhaust pressure, and a diaphragm operated by pressure from the reservoir and connected for moving said slide valve member to open said exhaust pressure to the atmosphere.

3. In an air brake system, in combination with the brake pipe line, reservoir and triple valve, a pressure retaining device interposed therein and connected to receive the exhaust after the application of said brakes, a spring pressed valve therein for holding said exhaust pressure in said device, and a second valve movable to open said device to the atmosphere, said second valve being normally held closed by air pressure from the brake pipe line, and a division diaphragm whereby increased pressure in said reservoir operates to move said second valve to open said device to the atmosphere and release said exhaust pressure.

4. In combination with an air brake system, a pressure retaining device connected therein to receive the exhaust therefrom after the application of the brakes, and a valve member in said device connected to be operated by increased pressure in said air brake system, whereby to open said exhaust and cause complete release of said air brakes, said valve being operated by a division diaphragm operatively connected to operate said valve.

5. In combination with an air brake system and the reservoir, a pressure retaining device connected to the exhaust, a spring controlled valve therein controlling exhaust from said device, a slide valve therein controlling a second exhaust from said device, and a division diaphragm for operating said slide valve, said diaphragm being controlled and operated by increased pressure in said reservoir, whereby said increased pressure operates to open said slide valve and said exhaust, substantially as described.

6. In combination with an air brake system, the triple valve and reservoir, of a pressure retaining device connected to said triple valve to receive the exhaust, and a valve therein controlling exhaust therefrom, said valve being connected to be operated to the open position by increased pressure in said reservoir, said operating connection including a dead end chamber with a movable part connected to said valve.

Signed at San Bernardino, San Bernardino County, California, this 24th day of July, 1925.

HARVEY H. ASKEW.
JAMES H. ASKEW.